No. 697,075. Patented Apr. 8, 1902.
J. DOW.
ROTATING PISTON ENGINE.
(Application filed Dec. 29, 1900.)

(No Model.) 9 Sheets—Sheet 4.

Fig. 5

No. 697,075. Patented Apr. 8, 1902.
J. DOW.
ROTATING PISTON ENGINE.
(Application filed Dec. 29, 1900.)
(No Model.) 9 Sheets—Sheet 5.

Fig. 6

Witnesses:
W. A. Schaefer.
F. L. Moister

Inventor.
Josiah Dow.
By his Attorney Chas. A. Pautter.

Fig. 7

No. 697,075. Patented Apr. 8, 1902.
J. DOW.
ROTATING PISTON ENGINE.
(Application filed Dec. 29, 1900.)
(No Model.) 9 Sheets—Sheet 7.

Fig. 8

Witnesses:
W. A. Schaefer.
F. L. Moister.

Inventor.
Josiah Dow.
By his Attorney Chas. A. Rutter.

No. 697,075. Patented Apr. 8, 1902.
J. DOW.
ROTATING PISTON ENGINE.
(Application filed Dec. 29, 1900.)

(No Model.) 9 Sheets—Sheet 8.

Fig. 9

No. 697,075. Patented Apr. 8, 1902.
J. DOW.
ROTATING PISTON ENGINE.
(Application filed Dec. 29, 1900.)
(No Model.) 9 Sheets—Sheet 9.

UNITED STATES PATENT OFFICE.

JOSIAH DOW, OF PHILADELPHIA, PENNSYLVANIA.

ROTATING-PISTON ENGINE.

SPECIFICATION forming part of Letters Patent No. 697,075, dated April 8, 1902.

Application filed December 29, 1900. Serial No. 41,445. (No model.)

*To all whom it may concern:*

Be it known that I, JOSIAH DOW, a citizen of the United States, and a resident of the city and county of Philadelphia, State of Pennsylvania, have invented certain new and useful Improvements in Rotating-Piston Engines, of which the following is a specification.

My invention relates to improvements in compound reversing-piston engines; and the object of my invention is to furnish certain improvements in such engines, as fully described hereinafter.

In the accompanying drawings, forming part of this specification, and in which similar numerals of reference indicate similar parts throughout the several views.

The main shaft 1 passes through the engine from end to end and has ample bearings provided not only in the heads of the outer case at 2, but also in the center of the case at 3 and in the sections between the high and low pressure cylinders at 4. This arrangement of the main bearings is not only to provide a very ample bearing-surface for the shaft to sustain high speeds, but is also to keep it perfectly central, without opportunity for vibration, for a steady run of the pistons within their annular cylinders.

5 represents the cylinders for the high-pressure initial steam, and 6 the cylinders for the low-pressure steam. The cylinders 6 are connected with the cylinders 5 by suitable passages controlled by a proper valve, and the cylinders 6 are connected to a suitable terminal or exhaust. The cylinders are separated by non-conducting spaces and are placed side by side, the two high-pressure cylinders being preferably at the center and the low-pressure cylinders being upon the outside. It will be understood that this arrangement may be reversed; but for compactness of valve action, as well as for prevention of radiation and conduction from the high-pressure steam, the arrangement shown is preferable. The inner cylinders 5 of each pair of cylinders are formed one half in the main case and the other half in the sections 10. The outer cylinders 6 are formed one half in the sections 10, the other half in the sections 11. The parts 8 and 10 of the main case are furnished with double slip-joints 14, and the parts 10 and 11 with similar joints 13. The part 8 carries the extensions 12, which are cylindrical in form and into which the parts 10 and 11 are pushed. All these parts are held firmly in place by means of the outside heads 21, which are bolted to the main case, as shown. The parts 10 and 11 are removable for purposes of construction and for the introduction of the pistons. The outer bounds of the cylinders 5 6 are made steam-tight and continuous by means of the double slip-joints 13 14; but their inner bounds are separated by a space sufficient to permit the annular disks 15, carried by shaft 1, to pass. The disks 15 carry the pistons 16 17 and are furnished with hubs 18, which are keyed or otherwise firmly secured to shaft 1.

19 represents piston-holders carried by disks 15, which support the pistons before and behind.

25 represents packing-rings concentric with cylinders 5 6, which are carried in grooves in the sections 8 and 10 and 10 and 11. The grooves which carry the packing-rings 25 are placed just inside the point 24, at which the disks 15 enter the cylinders.

26 represents piston-rings carried by pistons 16 17. These rings do not entirely surround the pistons, but have their open ends fitted into seats made for them in the piston-holders 19. When in place, these rings not only prevent leakage past the pistons, but act as bolts to firmly hold the pistons from straining radially outward in their holders, and thereby help to avoid wear in the cylinder.

The interspaces between the cylinders contain connecting transverse cylindrical stiffening-pieces 27 28, which firmly hold them in position, and strong webs 29, which secure them from any distortion of form. The stiffening cylindrical portions have cast with them strong inward annular disks 30 31, which connect them with the bearings 3 4, in which the main shaft runs.

Figure 1:
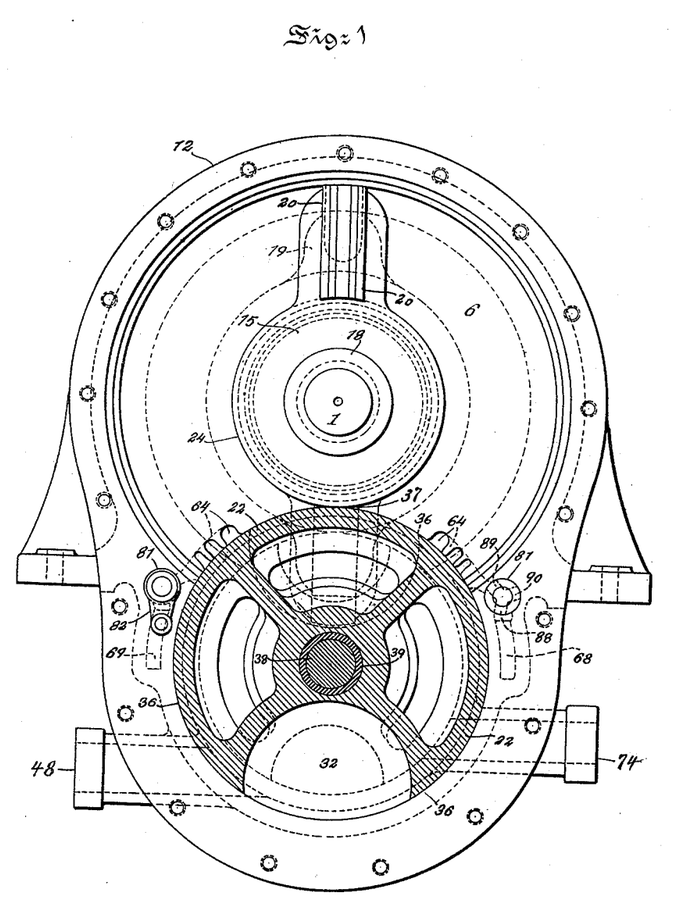
Figure 1 is a front elevation of my engine with the head and the first internal section, in which the outer half of the first low-pressure cylinder is formed, removed and the abutment belonging to that cylinder in section.

22 23 are abutments which entirely close one sector of the annular cylinders, as seen in Fig. 1, during the rotation of the pistons through them, except at the time when it is necessary for the pistons to pass through the space in the cylinders occupied by the abutment. In order that the pistons may pass the abutments, these latter have a valve or opening 32 33 cut in them, which opening is presented just in time to receive the piston and is closed again immediately after the passage of the piston. In order to present the opening in the abutment-cylinders so that it will register positively with the pistons, the abutment-cylinders and the steam-pistons are caused to rotate synchronously by means of gearing, as will be presently described. The abutments for each pair of high and low pressure cylinders are constructed or joined in one piece, which rotates upon the bearing 38, guarded by the bushing 39. As there are in the present case two pairs of cylinders, there are two of these compound abutments 22 and 23 of identical construction, one introduced to its seat from each end of the engine. At the outer ends of the compound abutments are axial projections covering part of the bearing 38 and forming hubs 39, upon which are seated the hubs of the gears 40, which mesh with gears 41, having their hubs directly upon the main shaft 1. These gears drive the abutments and keep them in synchronous action with the pistons 16 17, which are carried by and turn with shaft 1. Near both ends of the cylinder of each abutment—i. e., the abutments for each piston—are seats for packing-rings 42, which pass entirely around the cylinder and prevent lateral leakage of steam.

The gears which drive the abutments 22 23 are located within recesses made within the heads 21 of the main case. The actuating end of the main shaft passes outward through the bearing 2 in the head 21, and the other end is held within an outward closing of its bearing-piece 43 and has at the axial center an opening 44, to which may be attached a lubricator feeding into the opening through the center of the shaft and by passages connecting thereto outward to all the surfaces needing lubrication within the surrounding parts of the engine.

It is necessary for the purpose of compounding to have the pistons of both cylinders of a pair attached to the disks upon the same radius. Therefore to obtain a perfect balance the pistons of the other pair are placed upon a diametrically-opposed radius.

Around the whole engine I prefer to leave a space within the lagging 45 for air or such material as may best secure the contained heat from outward conduction or radiation.

Figure 2:
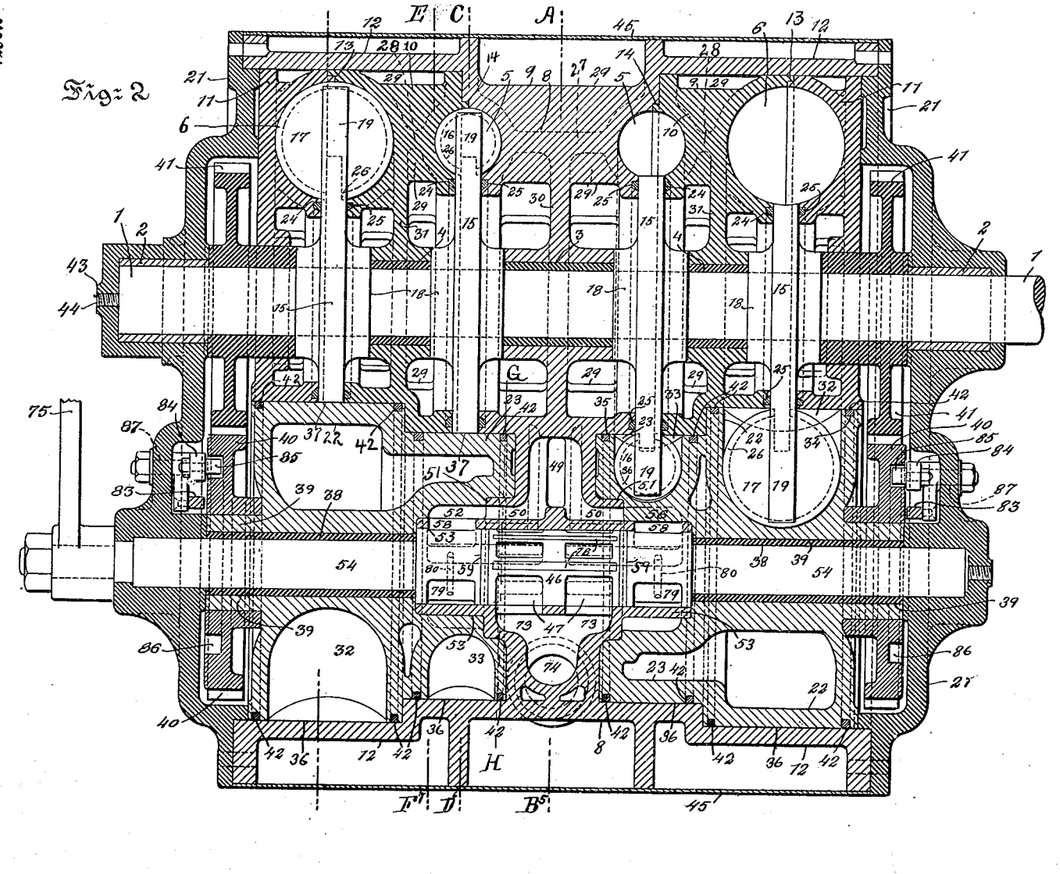
Fig. 2, a longitudinal central sectional elevation through my engine.

The arrangement of the main valve 46 and the steam-passages to and from both cylinders of one pair is shown in Figs. 3, 4, 5, 6, and 7 and a general arrangement for both pairs in Fig. 2. The portion of the valve 46 which in duplicate controls the distribution for both pairs is shown in position in Fig. 2 and in section in Figs. 3 and 4. Steam enters the center of the engine through the pipe 48, Figs. 1 and 5, and the passage 49, Figs. 2 and 5, from whence it enters the passage 50 and passes outward through the end of the cylindrical projection 51 of the valve-case, Figs. 2 and 4, and fills the annular space 52, Figs. 2 and 4, which is within the abutment and surrounds a smaller and farther-continued cylindrical projection or sleeve of the valve case or seat 53, Figs. 2, 4, 5, 6, and 7, upon the same axis which is attached to projection 51. Within and through these double projections, passing the center of the engine, is seated the main valve 46, having stems 54 passing outward to either end of the engine and forming the bearings 38, upon which the abutments 22 23 rotate, as shown; but these stems may pass through firmly-attached sleeves, upon which the abutments would then rotate. This valve is carried in a smoothly-fitting seat within the cylindrical steam-passage holder 51 52, which extends in duplicate outward from the center of the engine toward either end and contains the passages now to be described.

The passages in question radiate from the valve, there being a set for each pair of cylinders. The steam has always, through passage 50, free access to the annular spaces 52; but from these spaces it must pass through the extended sleeve 53 of the cylindrical valve-seat only by means of the port 58, which is closed when the high-pressure piston 16 is passing its abutment by means of the intruding bearing-piece 56, (best shown in Fig. 7,) which is limited in length of arc to the space necessary for cutting off the steam while the abutment is open. At all other times the steam may pass freely to the distributing-port of the valve, which it enters through the passage 57 by means of one of the ports 55, Figs. 5 and 7; but it will be seen that by a partial rotation of the valve 46 about its center the port 55 in the valve and the port 58 in its seating-sleeve 53 will be thown out of line with each other and at length each will be entirely closed to the other. It is by such partial rotation of the valve that the steam admission to the high-pressure cylinder is controlled from the exertion of a full-boiler pressure down to the closest cut-off and the power of the engine is increased or diminished. There are, however, two such ports 55 cut in the valve at this part, one to be presented to the port 58 with the forward motion of the engine and the other with the backward motion on reversal of the valve. The distance between these ports in the valve in its relation to the width of the ports themselves is such that the valve will not be reversed in the distribution of steam, as will be further explained, until a safe space after the port has become entirely closed. Therefore the steam is completely shut off during the operation of reversal.

Figures 3, 4, 10:
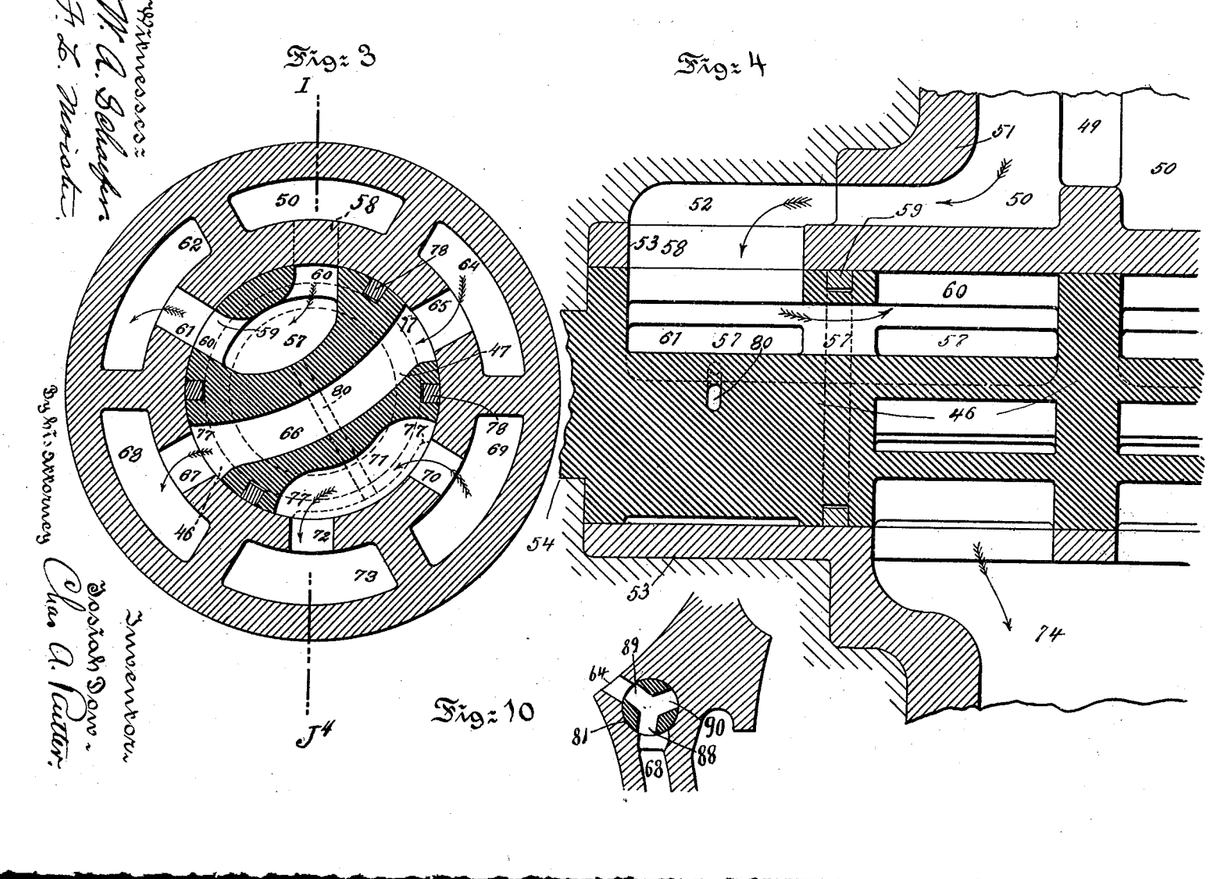
Fig. 3, an enlarged section through the main valve on the line G H, Fig. 2.
Fig. 4, a section of Fig. 3 on line I J⁴.
Fig. 10, a transverse section through the three-way valve and its seat, which operates to cut off the admission of the actuating fluid to the cylinders during the passage of the pistons through the ports in the abutment.
Figure 5:
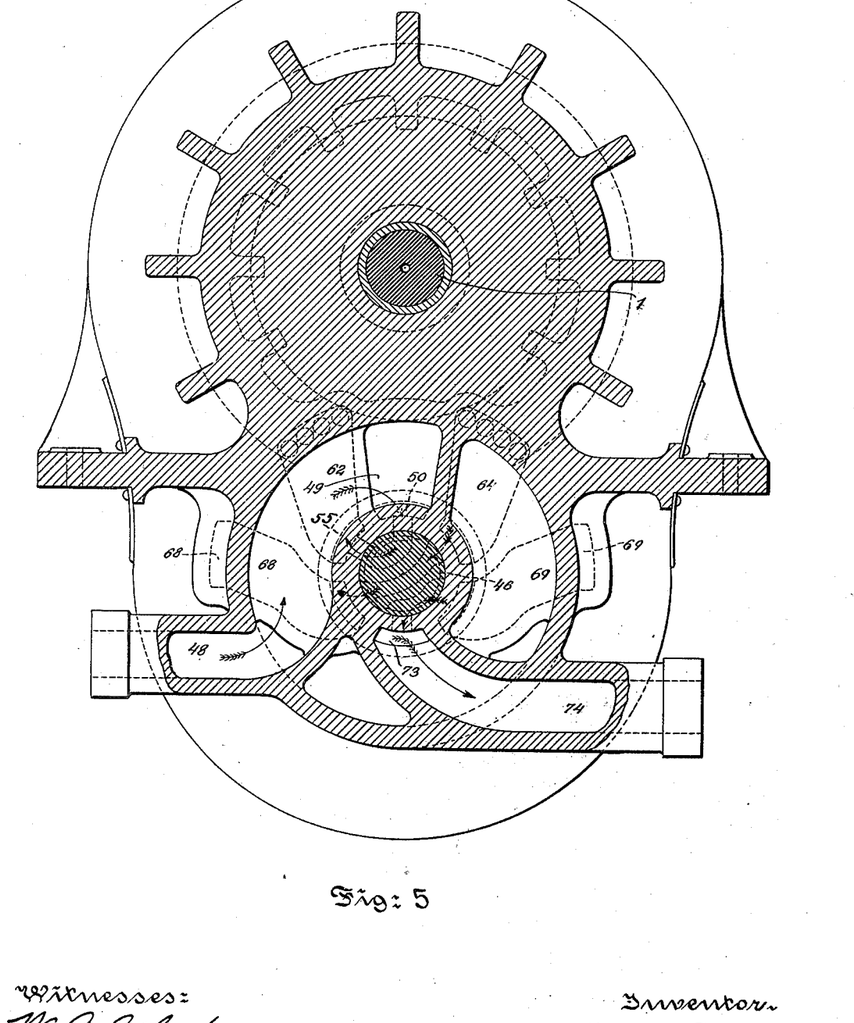
Fig. 5, a section of Fig. 2 on line A B⁵.
Figure 6:
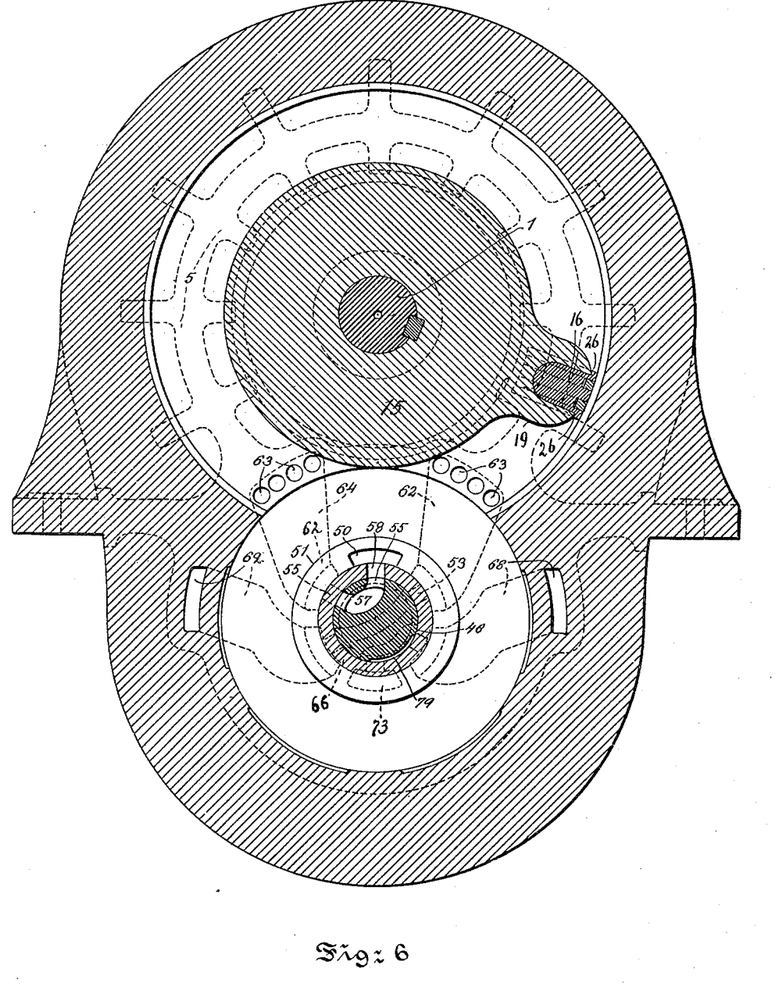
Fig. 6, a section of Fig. 2 on line C D⁶.
Figure 7:
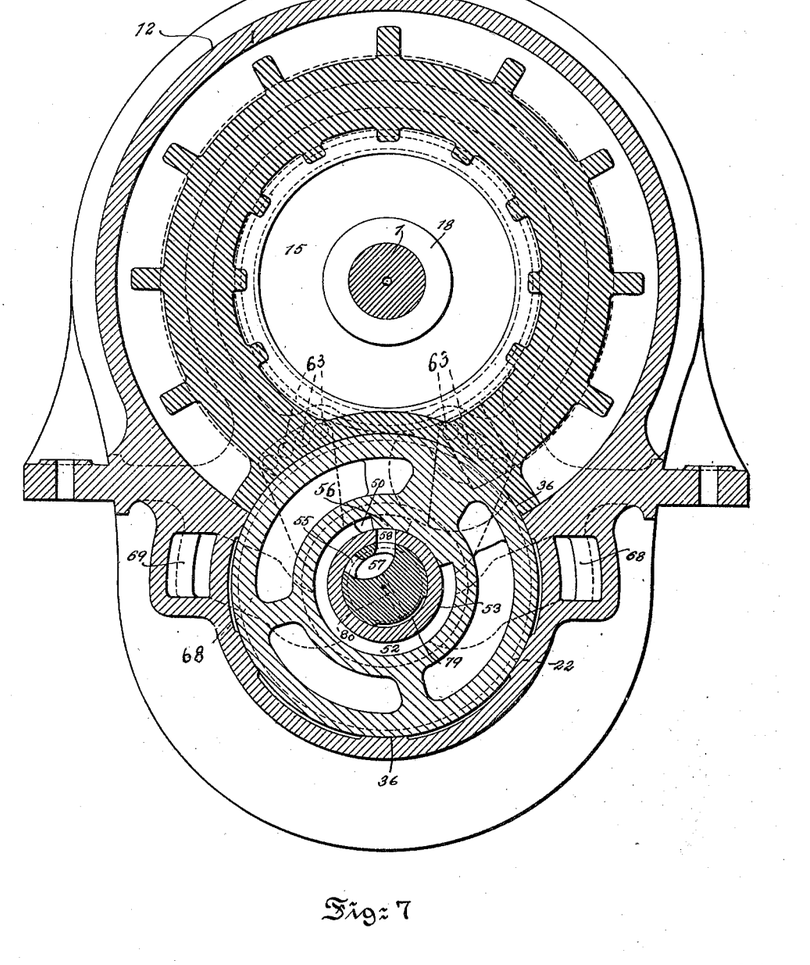
Fig. 7, a section of Fig. 2 on line E F⁷.

From the steam-distributing passages and ports shown in Fig. 3 it will be seen that the steam-inlet passage 50 has no port directly inward to that portion of the valve which contains its distributing and reversing passages and can only pass transversely outward and then inward to that portion of the valve by means of the ports 58 55, Fig. 6, and the operation just described; but the ports in this part of the valve connect by the passage 57, which passes inward under the packing-rings 59 and meets when within the distributing part of the valve two similar ports 60 in line with the outer ones, 55, and these inner ports become an essential part of that distributing system. In Fig. 3 the relation of the steam-distributing passages to each other and their control by the valve is shown. By following the arrows this distribution can be readily seen. Steam passing inward through the passage 57 reaches the two similar internal ports 60, the one in line with the outside port in operation with 58 being completely closed through the seat of the valve being there entire; but the other is presented to a port 61, which opens into one of the passages 62, leading to the ports of the high-pressure cylinder. From Figs. 1, 5, 6, and 8 it will be seen that the cylinders have ports 63 64, through which steam can pass on either side of the closed abutment. The ports of the side from which the piston begins its stroke carry the initial steam to and behind it in effecting its propulsion, while the ports of the other side receive the exhausting steam from before the advancing piston. Upon reversing the functions of the above parts and passages the rotation of the pistons and their carrying-shaft will be reversed. The exhausting ports and passages of the high-pressure cylinder 5 must also carry the steam to the passages and ports of the low-pressure cylinder 6, and the exhaust ports and passages of the low-pressure cylinder must carry the now spent steam directly to the exhaust. The initial steam in passing through the passage 62, leading to the high-pressure cylinder, begins the cycle of its operation. When it is exhausted from this cylinder at the opposite side of its abutment, it passes back to the valve 46 through the passage 64 and the port 65 into a channel 66, cut through the valve to its other side, on passing through which it meets a port 67 in the valve-seat communicating with the passage 68, Figs. 3, 5, and 6, which passes outward and then transversely outside of high-pressure-cylinder abutment-wall, as shown in Figs. 5, 6, and 7, to the port 64 in the low-pressure cylinder 6, Fig. 1. These ports are used for admission to that cylinder. The outer ends or ports of the passage 66, which register with the seat-ports 65 67, are somewhat wider than these ports, so that they will not be closed until after the ports 55 have made a complete closing of the ports 59; but they are so proportioned as to close them completely before the valve has reached the center of its reversal. The opposite port and passage 69, as in the high-pressure cylinder, receive the exhaust and convey it back to the valve again through the port 70 and into the passage 71, cut from the side of the valve, which conveys it to the exhaust-port 72 and passage 73, through which it passes from the engine by the pipe 74, Figs. 4 and 5, and thus the cycle is completed. It will be seen from Fig. 3 that a degree of revolution of the valve about its own axis sufficient to carry the port 60 in the valve, which is now central and closed, around to meet the port 65 in the valve-seat, now used for exhaust from the first or high-pressure cylinder, this port and its passage 64 will then become the inlet for the initial steam to that cylinder, while the opposite port 61 and passage 62 will be presented to the cross-passage 66 in the valve, which passage will meet the port 70 and passage 69, leading to the low-pressure cylinder, and the exhaust-valve passage 71 will be presented to the opposite port 67 and passage 68 from the low-pressure cylinder, and the movement of the pistons in both cylinders will be reversed. Simultaneously with this action reversal takes place for the other set of cylinders through identical means, and the direction of rotation of the whole engine is reversed.

Figure 9:
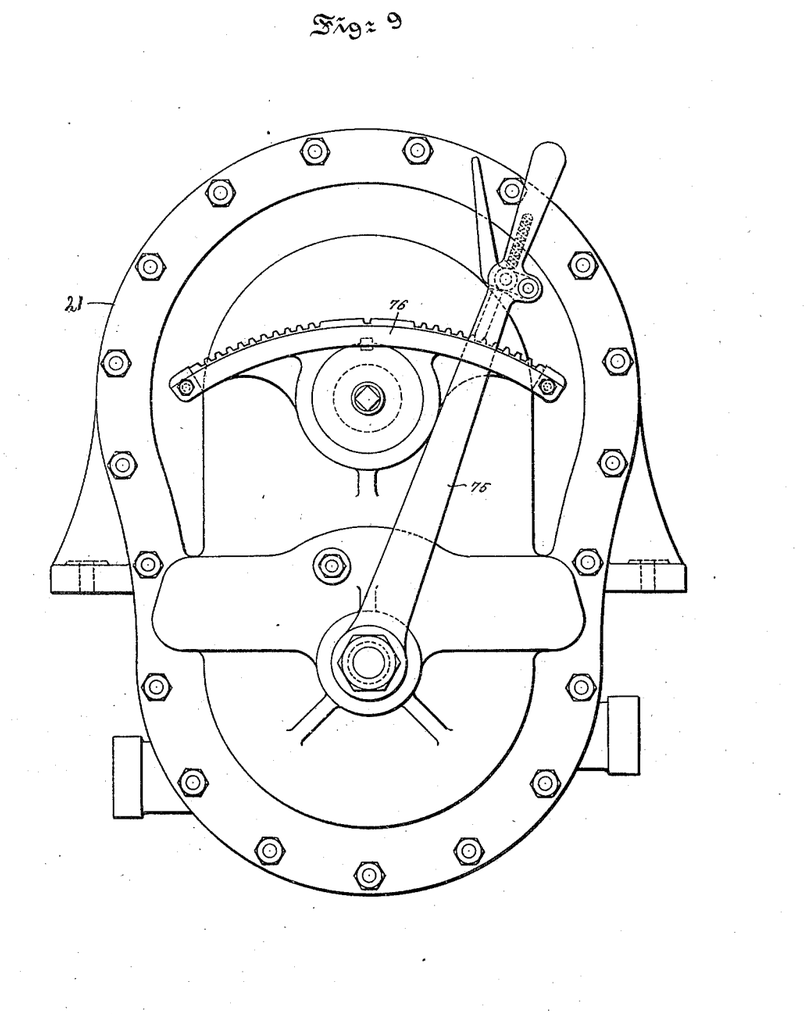
Fig. 9, a front elevation of the complete engine, showing the reversing-lever and rack.
Figure 11:
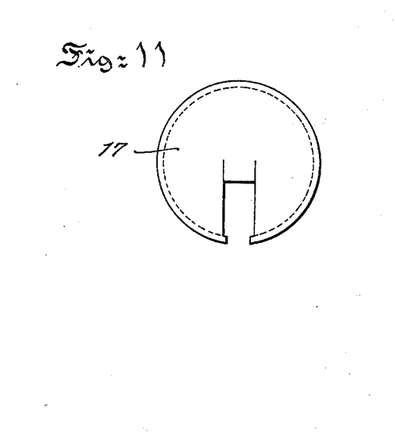
Fig. 11, a front elevation of the circular piston.
Figure 12:
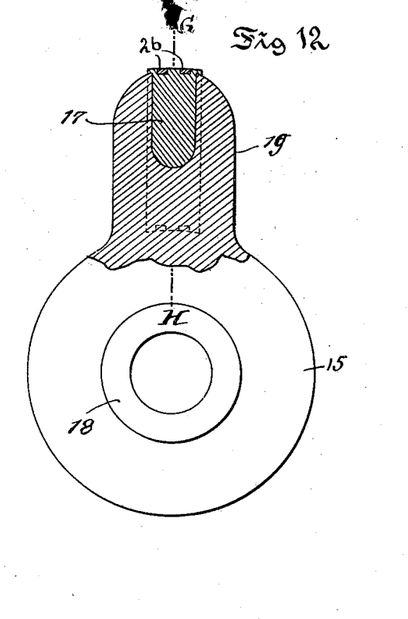
Fig. 12, a central sectional side elevation through the piston and its holder.
Figure 13:
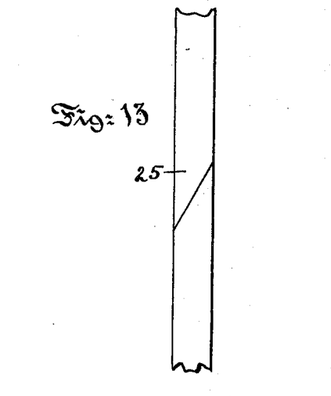
Fig. 13, a side elevation of portion of one of the split packing-rings, showing the split portion thereof.

75, Figs. 2 and 9, is the lever by means of which the valve is operated; 76, a rack by means of which the position of the lever may be maintained.

In order to regulate the velocity of rotation and power exerted in the engine, it is necessary to regulate the admission of steam at the ports 55 58, Figs. 5 and 6, by a partial revolution of the valve 46 from a complete opening through these ports to their complete closing. In the present construction this is effected by movement of the valve through an arc of twenty-one degrees, taken from either end of the whole arc of valve rotation, and the ports cut in the valve at 77 77 77 77, Fig. 3, are made of sufficient width to permit this closing off of the steam, even to completion, without destroying the circulation to and from the cylinders for that direction of rotation; yet the spaces between these ports are sufficient, aided by the packing-strips 78, to effectually prevent any cross-leakage. From the rack 76, Fig. 9, and valve 47, Fig. 3, it will be seen that the power and direction of rotation may be completely controlled through movement of reversing-lever 75 from full steam in one direction back through degrees of cut off to complete shut off of steam without reversal of the engine to effectual closing of all the ports in mid-reversal, then on to reversal and smallest admission of steam, and finally to maintenance of this reversal and full admission again.

Packing-rings 59 (shown in full lines in Figs. 2 and 4 and in dotted lines in Figs. 6 and 7) are placed in seats prepared for them upon the body of valve 46 between the portions of that valve used for distribution, as in Fig. 3, and the outer or admission portions and may also be placed between the two distributing portions to guard against leakage. Packing-strips 78 are also placed between the distributing-ports of the valve, as shown in Fig. 3, for the same purpose.

In order to obtain a balance of the valve within its seat, and thereby avoid frictional resistance from one-sided pressure opposite ports 55 55, a shallow portion 79 is cut away from the valve-body. This portion 79 communicates with steam-passage 57 by means of a small opening 80. If sleeves are used to cover the stems of the valve, which are the axes of rotation for the abutments, friction and pressure will be avoided there.

It will be seen that where the steam-passages terminate in the cylinder-ports 63 64 these ports are not continuous, but formed by circular or ovate openings through the inner shell of the cylinder, as shown in Figs. 1 and 5. This is for the purpose of affording an easy riding of the pistons and their rings over the ports.

Figure 8:
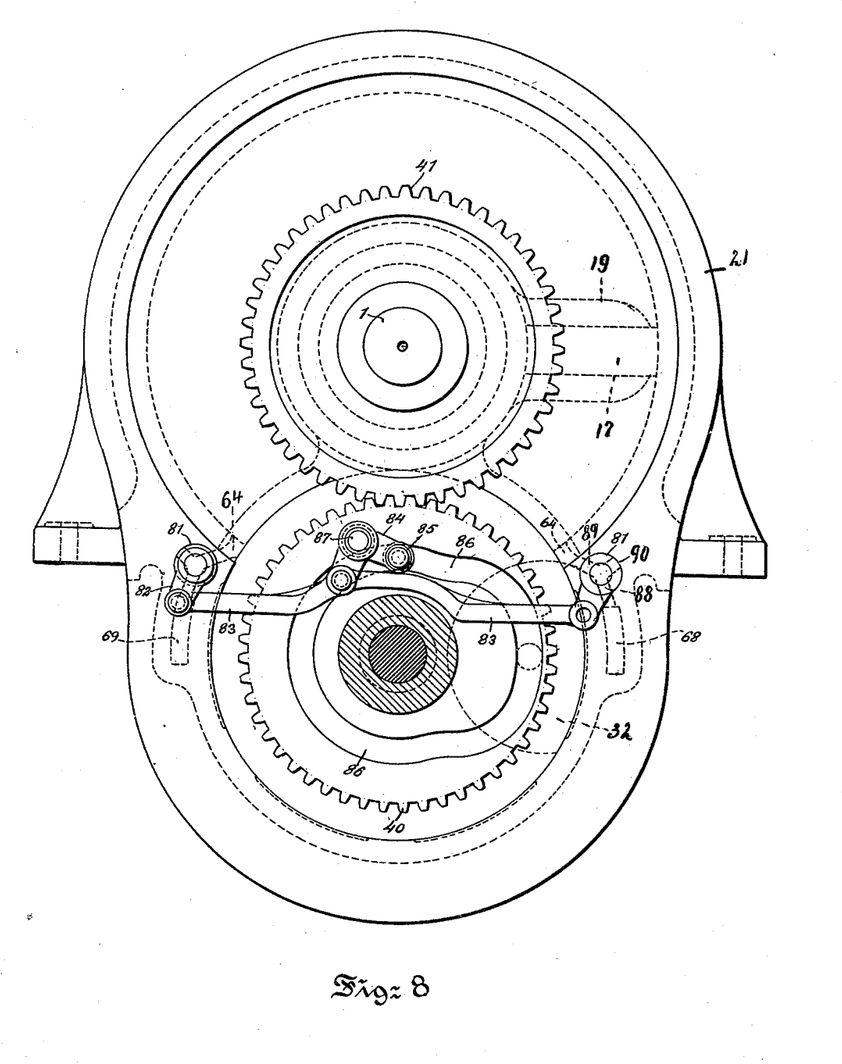
Fig. 8, a front elevation of the engine with head removed, showing an end elevation of the valves for the low-pressure cylinder and cam-and-crank arrangement by which these valves are controlled.

The valve action described has covered every necessary operation connected with the distribution of steam for the whole engine with the exception of a closing of the ports leading to the low-pressure cylinders during the passage of the pistons through their abutment. This closing is necessary in both cylinders in order that no steam may pass to and from them during this time when the open abutment would leave a passage through. The closing and opening of these ports is effected at the proper time by means of the cylindrical valves 81, Figs. 1 and 7, which have three equidistant slots cut through them transversely and meeting each in the center of the valve. When the valve is open, one slot, as 88, is presented as a port to the passage 68 69, another, as 89, to the cylinder-port 64, and the other, 90, to the valve-seat only. This arrangement secures balance of the valve and its easy rotation, which is just sufficient to perfectly close the cylinder-port and back to a complete opening again. This movement is effected by means of the crank 82, fixed upon the valve-stem, which by the bar 83, Fig. 8, is attached to its counterpart on the other side, and by means of the bell-crank 84 both of these bars may be moved simultaneously.

85 is a roller carried by bell-crank 84, which fits into the cam-groove 86, formed in the outside of the gear 40 or in a separate plate carried by the shaft which carries this gear, which rotates synchronously with the cycle of the engine. The bell-crank 84 has its bearing upon a stud 87, fixed to the outer head of the engine, Fig. 2. The revolution of the gear 40 or the plate carrying the cam-slot 86 carries, through the cam 86, the bell-crank 84 to be rocked upon its pivot 87, and the motion of this crank being communicated to rod 85 the valves 81 are operated at proper intervals to open and close the ports which they govern.

Having thus described my invention, I claim as new and desire to secure by Letters Patent—

1. In a rotating-piston engine, in combination, a cylindrical shell or case inclosing and firmly holding in position annular cylinders formed in section and fitted together as described, a continuous main shaft passing through the common axis of said cylinders, disks carried by hubs on said shaft, one to each annular cylinder, piston-supporting arms projecting radially from the peripheries of the said disks, pistons carried by said arms and adapted for rotation through said cylinders, abutment-cylinders with self-contained seats rotating in bearings formed in or carried by the outside shell or case and furnished with ports for the passage of the pistons, gears whereby said abutment-cylinders and said piston-carrying disks are caused to be rotated synchronously, and valves for controlling the admission and exhaust of the actuating fluid to and from said cylinders.

2. In a compound rotating-piston engine, in combination, high and low pressure annular cylinders, having their axis of generation identical with that of a main shaft which is continuous through the whole series, placed side by side upon different planes, each cylinder having its annular center of gyration a circle and its transverse section also in the form of a circle, sectional two-part shells in which each of said cylinders is formed which are furnished with radial and central braces and with ribs for firm holding in an outside case forming part of the central cylinder-casting and against one another, said outside case, a central and common shaft, disks, one for each cylinder, carried by said shaft carrying radial piston-supporting arms, pistons carried by said arms, cylindrical rotating abutments, furnished with integrally-constructed seats, for closing and opening the continuity of said annular cylinders at one radial point and with ports for the passage of the pistons, means for synchronously rotating said pistons and said abutments, and means for admitting the actuating fluid to and for exhausting it from said cylinders.

3. The combination in a rotating-piston engine, of annular high and low pressure cylinders placed concentrically around a common axis but upon different planes, each cylinder having the internal form of a ring of circular cross-section and formed by a shell supported and braced externally, the common axis of said cylinders being identical with that of a main shaft passing continuously through the center of a cylindrical outside case forming part of the casting of the central cylinders, said annular cylinders being formed in removable transverse sections, one fitting into another by slip-joints, to form steam-tight and continuous interiors, and with exterior braces and flanges by means of which they are firmly held in position within the outside case, said outside case divided through its transverse center through to a bearing upon the main shaft by an annular partition flanked by latitudinal braces or webs dividing the case-casting into two parts and separating the two annular cylinders contiguous to the center and to each other while interposing insulating-spaces between them, each of said contiguous annular cylinders having one transverse half formed in the said transverse partition of the outside case and integral with it, but its mating transverse half is formed in one of the said removable sections, circular disk-like pistons rotating within said cylinders, arms, which carry said pistons, fixed upon radially-carried disks, means for preventing free circulation of steam through one portion of said cylinders during its action upon said pistons, and means for controlling and conducting admission of steam to and its exhaust from said cylinders.

4. The combination with the annular cylinder and the main shaft of a rotating-piston engine of a disk carried by and at right angles to said shaft, one portion of said disk being extended to form a double-armed and inner braced piston-holder, a circular removable piston cut away to permit fitting within the holder and over its inner braced portion, a packing ring or rings adapted to be inserted in said piston and to pass around its periphery from one side of said cut-away portion to the other side thereof, and the ends of which are adapted to enter said holder one end upon one side, the other at the other side, and to form, in addition to a steam-tight joint between said cylinder and piston, means for securing said piston to said holder.

5. The combination in a compound rotating-piston engine, of annular cylinders placed side by side and having their centers of generation identical with that of a common and continuous main shaft, said cylinders being formed in outwardly-braced shells each shell being separable transversely through its center into two parts each part being adapted to be held in position by an outside case forming part of the middle cylinder and by interior bearings upon and about the main shaft, said cylinders having the form of circular annular rings and being separated by webbed interinsulating-spaces, said outside case, said main shaft, disks carried by said shaft, one for each cylinder, said disks being furnished with projecting piston-holders, pistons carried by said holders, beveled split packing-rings, 24, 25, concentric with said cylinders, carried by the shells in which said cylinders are formed and adapted to engage the sides of the piston-carrying disks and adapted by their shape to be pressed in against the disks by the pressure of steam from the cylinders, a rotating abutment furnished with ports for the passage of the pistons, and means for conducting the actuating fluid to and away from said cylinders.

6. An engine-casing consisting of a central or main portion 8, furnished with extensions 12, sections 10 and sections 11 adapted to be held peripherally by the extensions 12, and heads 21 adapted to be bolted to the extensions 12; said sections 8, 10 and 11 having formed in them circular annular cylinders, said cylinders being formed one half in one section and the other half in the adjacent section, and said portion 8 having formed in it seats for a rotating abutment and a rotating valve.

7. In combination, an engine-casing and separable shells carrying two or more annular cylinders having their center of generation identical with that of a common and continuous main shaft, said cylinders being placed side by side and being formed one half in one shell and the other half in another shell, said shells being held firmly in place by the casing and two or more of said shells being carried axially inward to form bearings for said main shaft.

8. In a cylinder-casing, in combination, an exterior case containing, firmly held in position upon different planes, sectional braced shells having formed within them annular cylinders whose center of generation is identical with that of the main shaft of the engine, said cylinders being formed half in one integral section and half in the contiguous section, one or more of said cylinder-carrying sections and the central integral part of the exterior case being continued inward and bored to form bearings for the main shaft.

9. In a rotating-piston engine, in combination, two or more sets of sections carrying annular cylinders placed side by side and concentric with a continuous main shaft, an outside case constructed integrally with the interior cylinders for holding said cylindrical shells, a central main shaft passing from end to end of said case, disks carried by said shaft, pistons carried by said disks, rotating abutments, with ports for the passage of the pistons, adapted to open and close one portion of the annular cylinders with each rotation of the pistons, and furnished at the outer ends with hubs one of which is adapted to carry a gear-wheel and the other to run in a bearing formed in the piston-casing, a fixed shaft or a sleeve upon which said abutment rotates, said gear-wheel upon said hub, a corresponding gear-wheel on the main shaft, and means for the admission and exhaust of steam to and from said cylinders.

10. The combination in a compound rotating engine, of a casing having formed therein annular cylinders generated from the same center, but upon different planes, a main shaft passing axially through said cylinders, disks having radial arms carried by said shaft, pistons carried by said arms, a rotating abutment carried in said casing adapted to engage at one part said disks and furnished with ports for the passage of the pistons, a shaft upon which said abutment rotates—gears carried by said main shaft and said abutment whereby they are caused to rotate synchronously, said abutment being in two parts and adapted to operate in connection with both the high and low pressure cylinders and being furnished upon its ends with hubs one of which is adapted to carry the gear-wheel and the other of which is adapted to run upon a bearing formed within the casing, and means for admitting steam to and for exhausting it from said cylinder.

11. A valve for a rotating engine comprising a stem furnished with an extended portion containing passages for conducting and distributing an actuating fluid, and a double cylindrical seat furnished between its inner and outer limits with passages each of which is furnished with a port adapted to connect with the passages in and through the valve and being themselves adapted to be connected with the inlet and exhaust ports of the engine-cylinders; said passages in said extended portion of the valve being adapted, in one position of said stem and valve, to admit the propelling fluid to passages in said seat from whence it passes to the rear of the pistons in the engine-cylinders, and by a partial revolution of said stem and valve to passages in said seat from whence it passes to the front of said pistons.

12. The combination with the annular cylinders, the pistons and the rotating abutments of a compound rotating-piston engine, of a cylindrical valve having its seat and axis through the longitudinal center of the abutment, said seat having, in axial line with each other, an outer cylindrical portion having cut through it a port to admit the actuating fluid to the valve and registering with either of two ports leading to a passage through the valve and an inner portion with cylindrical bearing formed within two cylindrical walls, one separated from and contained within the other, the interspace being divided by partitions into sectional annular passages one of which is shut off from that portion of the seat which is connected with the steam-inlet to the engine and leading to the outer or admission port of the valve-seat, others being connected, separately, by means of passages, to each side of the abutment closing of the annular high-pressure cylinder and onto the exhaust-opening of the engine, said valve being capable of a partial rotation within its seat and having two portions corresponding with the two portions of the seat, namely, an outer portion for reception of the initial actuating fluid connected with an inner or distributing portion containing passages and ports cut in through its body registering with ports cut through the inner cylindrical limits of this portion of the seat which admit the actuating fluid to the said sectional annular distributing-passages to govern the forward movement of said pistons, and in exhaust, or when rotated, to register with the passages which govern the backward movement of said pistons, and in reverse, exhaust.

13. The combination with the cylinders and pistons of a rotating-piston engine, of a cylindrical valve-seat comprising a distributing portion and a cut-off portion in axial line with each other, said distributing portion being formed with sectional annular passages surrounding the seat through which seat ports are cut leading to said passages and to the steam and exhaust ports of the cylinders, a valve comprising a distributing portion and a cut-off portion in axial line with each other, said distributing portion being furnished with passages adapted in one position to register with the ports in said seat leading to those in the cylinder which govern the admission of actuating fluid to cause a forward movement of the pistons and when rotated to register with those governing a reversal of the pistons, and the extended, or cut-off portion, of which is furnished with a port registering with one of two ports in the cut-off portion of the valve both of which lead to a passage through the valve connecting to the distributing-passages, said port in said extended portion of said valve being connected at the time the piston is passing through the abutment and the steam-ports are open to each other by an internal bearing-piece carried upon the inside of the rotating abutment and said bearing-piece.

14. A valve comprising a stationary part or seat and a rotatable cylindrical part, said stationary part consisting of an annular portion the inner bound of which surrounds and forms the seat for the distributing portion of the cylindrical valve; and which contains, separated by radial walls, passages furnished with ports connected with the distributing-passages through the cylindrical valve, also connected with the inlet and exhaust ports of a cylinder and being furnished at one end with a cylindrical projection or sleeve furnished with a port for the passage of the actuating fluid; the rotatable part of said valve being furnished with a passage through it connecting the distributing-section of said rotatable part and its ports with its inlet and cut-off section and ports, said ports being adapted to register, one at a time, in the distributing portion to one of two ports leading to the cylinder of the engine, and in the inlet portion to a port through the inclosing sleeve, and said cylindrical rotatable portion being further furnished with passages through the distributing-section adapted to conduct the actuating fluid from the passages leading from the high to the passage leading to the low pressure cylinders and from the low-pressure cylinder through the distributing portion to the exhaust, one position of said rotatable portion with its openings conducting the actuating fluid to the ports to cause a forward movement of the engine and another position to ports to cause a reversal of the movement.

15. The combination with the cylinders and rotating piston of a compound rotating-piston engine, of a cylindrical valve-seat comprising two portions in axial line with one another, namely, an outer portion for admission of steam to the valve and an inner portion with fluid passages and ports connected with a passage leading to the outer portion, a valve constructed in two parts in axial line with one another, that is an outer or cut-off portion and an inner or distributing portion, said outer portion being furnished with two ports on different radii and connected with the valve, one of said ports registering with a port through the valve-seat for forward action of the pistons and the other port adapted to register with the same port in the valve-seat for reverse action of the pistons, said fluid-passages in the inner portion of the valve adapted to register with passages in the inner portion of the seat which leads to and from the cylinders of the engine.

16. The combination with a rotating-piston engine as described, of an abutment-cylinder having an internal hollow cylindrical portion rotating over a sleeve fixed in its axis between which and said hollow abutment is formed an annular steam-chamber having projecting into it from the body of the abutment a bearing-piece running in smooth contact upon the sleeve and adapted to periodically cut off the flow of actuating fluid from a port cut through the sleeve to a valve within it during the passage of the piston through the ports in the periphery of the abutment-cylinder, said sleeve and said valve.

17. The combination with a rotating-piston engine as described of cylindrical valves having an outer or cut-off portion in axial line and connecting with an inner or distributing portion, the outer portion having two parallel steam-ports connecting with an internal passage adapted to admit and gradually cut off the actuating fluid passing through a port in the valve-seat, one of said ports serving for a passage of the actuating fluid to drive the pistons in one direction, the other for a passage of the fluid to drive them in the opposite direction, said internal passage in the valve being connected by an opening or openings to a cut-away portion of the opposing outer surface of the valve whereby a pressure of the actuating fluid against said cut-away portion may be obtained to balance against pressure through the open ports of said valve, and means whereby said valve may be partially rotated upon its axis.

18. The combination with a reversing rotating-piston engine as described, of three-way valves placed in the inlet and exhaust passages of the low-pressure cylinder by the side of the rotating abutment their axes parallel with its axis and near the emission and admission ports of the annular cylinder, axial stems upon said valves projecting beyond the abutment-seat, cranks carried by said stems, an arm or bar one end of which is connected to one crank and the other end of which is connected to the other crank, a cam formed upon the end of the abutment-cylinder or its accompanying gear and rotating with it, and a bell-crank one end of which is attached to said arm or bar and the other end of which is operated by said cam and which is fulcrumed to a fixed point, said parts being so disposed that said valves will cut off the flow of actuating fluid to and from the high-pressure cylinder during the passage of the low-pressure piston through the port in the abutment.

19. A cylindrical valve, arranged for partial rotation upon its own axis, having two portions in axial line with each other, one containing two central ports parallel with the axis and with each other connected with an internal passage through the valve and the other portion with distributing-passages constructed to register radially with ports through the seats of this portion of the valve, one to and one from the high-pressure cylinder of a compound engine, one to and one from the low-pressure cylinder, and one to the exhaust from the engine, said partial rotation of said valve being adapted, through means of one or other of the two ports cut through the outside or cut-off portion coming into registration with a port cut in the valve-seat of this portion, or such registration being changed to complete closing of said seat-port; to control the steam admitted to the engine from full admission to no admission, without disturbing the cycle or reversing the engine, the ports of the distributing portion of the valve being cut wider than those of the cut-off portion, then, by continuing the rotation to reverse the position of the steam-passages and ports throughout the valve and consequently reverse the engine, at first without admission of steam through the port in the outer bearing, then inward through least admission to full admission.

JOSIAH DOW.

Witnesses:
CHARLES A. RUTTER,
GEORGE W. SELTZER.